(12) United States Patent
Ruschitzka et al.

(10) Patent No.: US 12,070,804 B2
(45) Date of Patent: Aug. 27, 2024

(54) MOUNTING SYSTEM FOR A GRINDING MACHINE

(71) Applicant: Schaeffler Technologies AG & Co. KG, Herzogenaurach (DE)

(72) Inventors: Eckhard Ruschitzka, Herzogenaurach (DE); André Kuckuk, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 636 days.

(21) Appl. No.: 17/261,404

(22) PCT Filed: Jun. 28, 2019

(86) PCT No.: PCT/DE2019/100602
§ 371 (c)(1),
(2) Date: Jan. 19, 2021

(87) PCT Pub. No.: WO2020/035102
PCT Pub. Date: Feb. 20, 2020

(65) Prior Publication Data
US 2021/0252608 A1    Aug. 19, 2021

(30) Foreign Application Priority Data

Aug. 16, 2018 (DE) ...................... 10 2018 119 937.6
Feb. 5, 2019 (DE) ...................... 10 2019 102 788.8

(51) Int. Cl.
*B23B 31/28* (2006.01)
*B23Q 1/00* (2006.01)
(Continued)

(52) U.S. Cl.
CPC ............ *B23B 31/28* (2013.01); *B23Q 1/0081* (2013.01); *B23Q 1/009* (2013.01); *B23Q 3/152* (2013.01);
(Continued)

(58) Field of Classification Search
CPC ...... B23Q 1/0081; B23Q 1/009; B23Q 3/152; B23Q 3/1543; B23Q 1/70; B23Q 3/08;
(Continued)

(56) References Cited

U.S. PATENT DOCUMENTS 2,741,481 A * 4/1956 Ortegren ................. B23B 31/28
279/128
2,812,185 A * 11/1957 Snell ....................... B23B 31/28
335/289
(Continued)

FOREIGN PATENT DOCUMENTS

| CN | 102886541 A | 1/2013 |
| CN | 104308609 A | 1/2015 |

(Continued)

*Primary Examiner* — Makena S Markman

(57) ABSTRACT

A mounting system includes a magnet core arranged for positioning inside a magnet coil. The magnet core includes a cylindrical, elongate receiving region with a central axis, a rapid-mounting mandrel arranged for insertion into the cylindrical, elongate receiving region, and a discoid workpiece driver, detachably fastened to the rapid-mounting mandrel and extending normal to the central axis. A one of the magnet core or the rapid-mounting mandrel includes a rapid-mounting device for mounting the rapid-mounting mandrel in the magnet core. Example embodiments may includes the rapid-mounting device integrated into the magnet core or integrated into the rapid-mounting mandrel.

8 Claims, 3 Drawing Sheets

(51) Int. Cl.
  *B23Q 3/152* (2006.01)
  *B23Q 3/154* (2006.01)
  *B24B 41/06* (2012.01)

(52) U.S. Cl.
  CPC ............ *B24B 41/06* (2013.01); *B24B 41/061* (2013.01); *B23Q 3/1543* (2013.01)

(58) Field of Classification Search
  CPC ....... B23Q 3/082; B24B 41/06; B24B 41/061; B24B 5/04; B24B 41/044; B24B 19/06; B23B 31/28; B23B 31/305; B23B 2260/10; B23B 2270/38
  See application file for complete search history.

(56) References Cited

U.S. PATENT DOCUMENTS

| | | | | |
|---|---|---|---|---|
| 2,864,622 | A | * | 12/1958 | Seidel ............... B23B 31/28 335/289 |
| 5,556,114 | A | * | 9/1996 | Fabris ............... B23B 31/305 279/2.08 |
| 7,367,102 | B2 | * | 5/2008 | Hosoe ............... B23B 31/28 269/21 |
| 2018/0029137 | A1 | * | 2/2018 | Yokoyama ......... B23B 31/28 |

FOREIGN PATENT DOCUMENTS

| | | | |
|---|---|---|---|
| CN | 105612017 | A1 | 5/2016 |
| CN | 107186557 | A | 9/2017 |
| CN | 206652987 | U | 11/2017 |
| CN | 206708181 | U | 12/2017 |
| CN | 207027071 | U | 2/2018 |
| DE | 2755494 | A1 | 6/1978 |
| DE | 3044818 | A1 | 6/1982 |
| DE | 3415333 | A1 | 10/1984 |
| DE | 102015220333 | A1 | 4/2017 |
| DE | 102015220533 | A1 | 4/2017 |
| EP | 1736265 | B1 | 9/2007 |
| EP | 3263274 | A1 | 1/2018 |
| JP | H01271141 | A | 10/1989 |
| JP | H03184735 | A | 8/1991 |
| JP | 2016112650 | A | 6/2016 |
| SU | 931358 | A1 | 5/1982 |

* cited by examiner

MOUNTING SYSTEM FOR A GRINDING MACHINE

CROSS-REFERENCE TO RELATED APPLICATIONS

This application is the United States National Phase of PCT Appln. No. PCT/DE2019/100602 filed Jun. 28, 2019, which claims priority to German Application Nos. DE102018119937.6 filed Aug. 16, 2018 and DE102019102788.8 filed Feb. 5, 2019, the entire disclosures of which are incorporated by reference herein.

TECHNICAL FIELD

The disclosure relates to a mounting system suitable for a grinding machine. The disclosure further relates to a method for handling such a mounting system.

BACKGROUND

A machine spindle having a mounting rod and a clutch unit is known from EP 1 736 265 B1. The clutch unit serves to connect an electrically driven drive shaft to a work shaft, which is provided for holding a tool. The clutch is actuated, for example, using electromagnets (FIG. 2 of EP 1 736 265 B1). Alternatively, EP 1 736 265 B1 (FIG. 1) proposes a clutch actuated by compressed air and having mounting bodies.

DE 34 15 333 A1 discloses a centerless grinding machine including a loading disk arrangement. On the machine side, which includes the loading disk arrangement, the arrangement of a drive element, i.e. driver, for a workpiece is provided opposite a grinding wheel. Regarding the tensioning of the drive element, reference is made to U.S. Pat. No. 2,812,185 A in DE 34 15 333 A1.

EP 3 263 274 A1 discloses a mounting device having a chuck and a mounting element that is mountable thereon. The mounting device is part of a mounting system, with which large workpieces or workpiece carriers can be mounted in the working region of a processing machine, for example a grinding machine.

SUMMARY

The disclosure describes a mounting system, suitable for a grinding machine, with improved manageability and high mechanical precision.

According to the disclosure, the mounting system includes a magnet core, arranged inside a magnet coil, which has a cylindrical, elongate receiving region, and a rapid-mounting mandrel provided for insertion into the receiving region, on which spindle a discoid workpiece driver, which is in a plane normal to the central axis of the receiving region, is detachably fastened. One of the two elements, the magnet core and the rapid-mounting mandrel, has a non-magnetic rapid-mounting device designed for the mounting and correct alignment of the rapid-mounting mandrel in the magnet core.

The disclosure also provides a method for handling such a mounting system. This method includes:
a fixed connection, e.g., a screw connection, is established between the rapid-mounting mandrel and the workpiece driver,
the assembly formed from the rapid-mounting mandrel and the workpiece driver is, if necessary, surface-ground independently of the magnet core, i.e. by means of a separate grinding device,
the rapid-mounting mandrel is inserted into the receiving region of the magnet core and mounted there in a non-magnetic manner, e.g., hydraulically, which at the same time aligns it in an exactly defined way,
a workpiece is mounted magnetically on the workpiece driver without further processing of the workpiece driver, e.g., without repeated surface grinding.

In an example embodiment of the method, the magnet core, which is already connected to a workpiece spindle, e.g., a grinding spindle, i.e. its receiving region, also known as the receiving bore, is ground to the finished size before the preconditioned, i.e. surface-ground, assembly of the rapid-mounting mandrel and the workpiece driver is hydraulically or mechanically fixed in the magnet core.

The configurations explained below in connection with the handling method also apply analogously to the mounting system, and vice versa.

The rapid-mounting device can either be integrated in the magnet core or in the rapid-mounting mandrel. In both cases, the rapid-mounting device can be either a hydraulic or a mechanical mounting device.

The rapid-mounting device may have two expansion regions spaced apart from one another. The distance between the center of one expansion region and the center of the other expansion region, measured in the axial direction of the rapid-mounting mandrel and the receiving region elongated corresponding to the rapid-mounting mandrel, may be greater than the diameter of the receiving region, e.g., at least the 1.5 times the diameter of the receiving region.

To actuate the rapid-mounting device, an adjusting screw is provided in an example embodiment, which can be actuated through an opening in the workpiece driver when the workpiece driver is connected to the rapid-mounting mandrel. The workpiece driver is screwed to the rapid-mounting mandrel with three screws, for example.

A difference to the prior art in the mounting system is that the desired, precisely defined alignment of a workpiece driver, which is required for axial run-out, is not achieved due to a spindle-side plane surface on which the workpiece driver rests, but rather due to the rapid-mounting device extended in the axial direction of the rapid-mounting mandrel in cooperation with a receiving region of precisely defined geometry.

The preconditioned assembly, which is formed from the rapid-mounting mandrel and the workpiece driver, can be installed multiple times in the magnet core and removed therefrom without having to be reworked in the installed state, for example by grinding. Only one end face on the magnet core may require cleaning during conversion work. The elongate shaft of the rapid-mounting mandrel can then be pushed into the receiving region up to the stop on this end face and fixed there, e.g., by turning an adjusting screw acting on a hydraulic medium.

The mounting system is used, for example, on a plunge grinding machine. For the technological background, reference is made to the documents DE 30 44 818 A1 and DE 27 55 494 A1, for example.

BRIEF DESCRIPTION OF THE DRAWINGS

In the following, several exemplary embodiments are explained in more detail by means of a drawing. In the figures.

DETAILED DESCRIPTION

Unless otherwise stated, the following explanations relate to all exemplary embodiments. Parts that correspond to each other or have basically the same effect are marked with the same reference symbols in all figures.

A mounting system indicated overall by the reference sign 1 is suitable for use in a grinding machine, namely a plunge grinding machine. Workpieces to be ground are to be mounted magnetically. In the present case, a workpiece spindle 2 is part of the grinding machine, which is not shown further.

Figure 5:
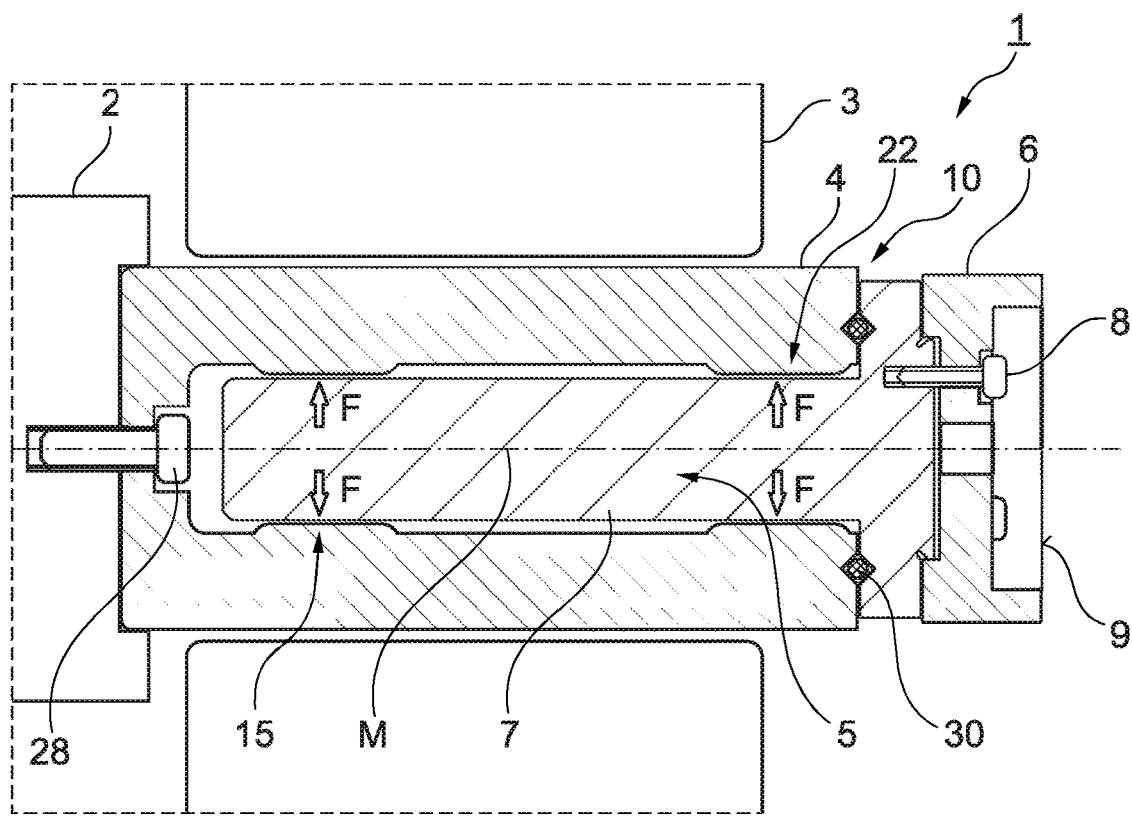
FIG. 5 shows a mounting system having a magnet core fastened to a grinding spindle and an assembly which is hydraulically mounted therein and formed from a rapid-mounting mandrel and a workpiece driver in a more detailed illustration compared to FIG. 1.

A magnet core 4, which is surrounded by a magnet coil 3, is attached to the workpiece spindle 2. The magnet core 4 has a cylindrical, elongate receiving region 5, which is also referred to as a receiving bore. A rapid-mounting mandrel 7 can be fixed in the receiving region 5, which is connected to a workpiece driver 6 during operation of the grinding machine and represents a rotating assembly. The central axis of this assembly 6, 7 is identical to the axis of rotation of the grinding spindle 2 and is denoted by M (ref. FIG. 5). A single fixing screw 8 (FIG. 1) or a plurality of such fixing screws 8 (FIG. 5) establish the fixed connection between the workpiece driver 6 and the rapid-mounting mandrel 7. The workpiece driver 6 has the basic shape of a disk, which lies in a plane normal to the central axis M.

When preparing the assembly 6, 7 for use in the grinding machine, which includes the workpiece spindle 2, the workpiece driver 6 is first screwed onto the rapid-mounting mandrel 7. The assembly 6, 7 is then processed by means of a further grinding device, not shown. The separate grinding device has a mounting mechanism, which is comparable with the receiving region 5 in terms of its dimensions. While the rapid-mounting mandrel 7 is fixed in the mounting mechanism of the separate grinding device, a workpiece stop surface, labeled 9, of the workpiece driver 6 is surface-ground to the finished size. A further grinding of this workpiece stop surface 9 in a later process stage is generally no longer necessary. Exceptions can be made, for example, if the tension of the fixing screws 8 is changed in the meantime. In modified embodiments (not shown), in which the fixing screws 8 are omitted, the workpiece driver 6 can be formed in one piece with the rapid-mounting mandrel 7. Alternatively, the first surface grinding of the workpiece driver 6 can take place in the installed state in the machine.

Figure 4:
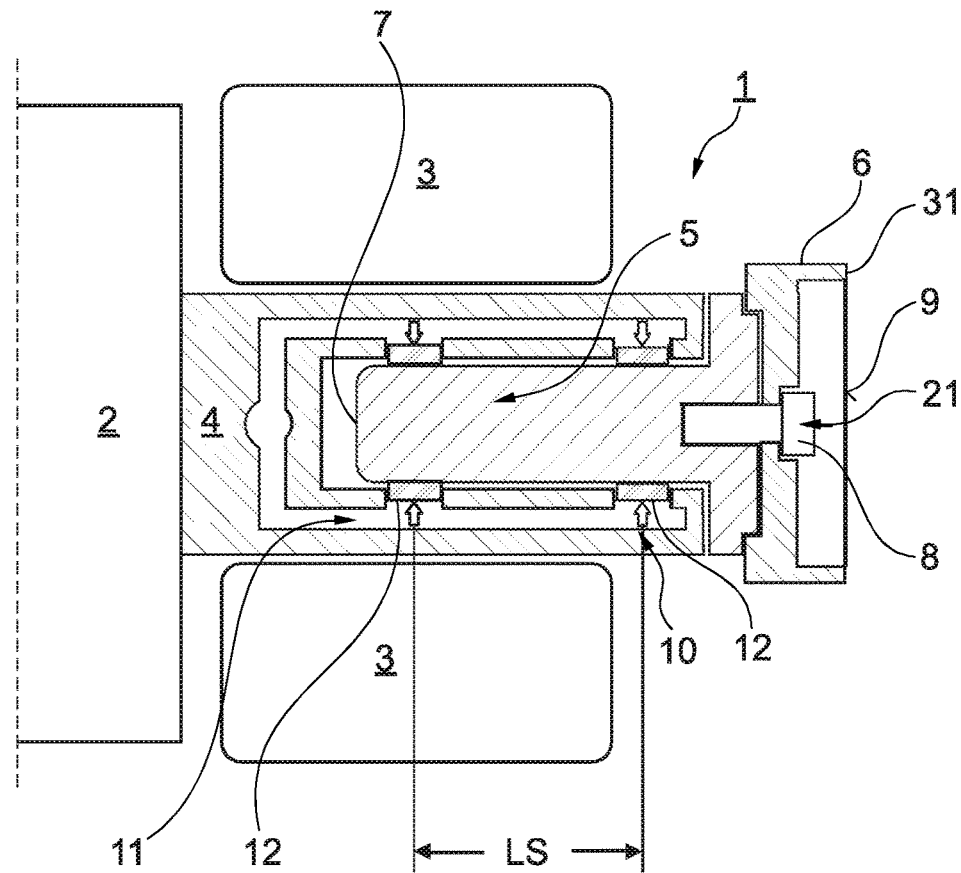
FIG. 4 shows a mounting system having a magnet core, which is also designed as a hydraulic chuck.

After the workpiece stop surface 9 has been ground to the finished size, the assembly 6, 7 is preconditioned. In this state, the assembly 6, 7 on the workpiece spindle 2 can be exchanged rapidly. The rapid-mounting mandrel 7 is mounted in the magnet core 4 using a rapid-mounting device 10, which is integrated either in the rapid-mounting mandrel 7 or in the magnet core 4 (FIG. 4).

Figure 2:
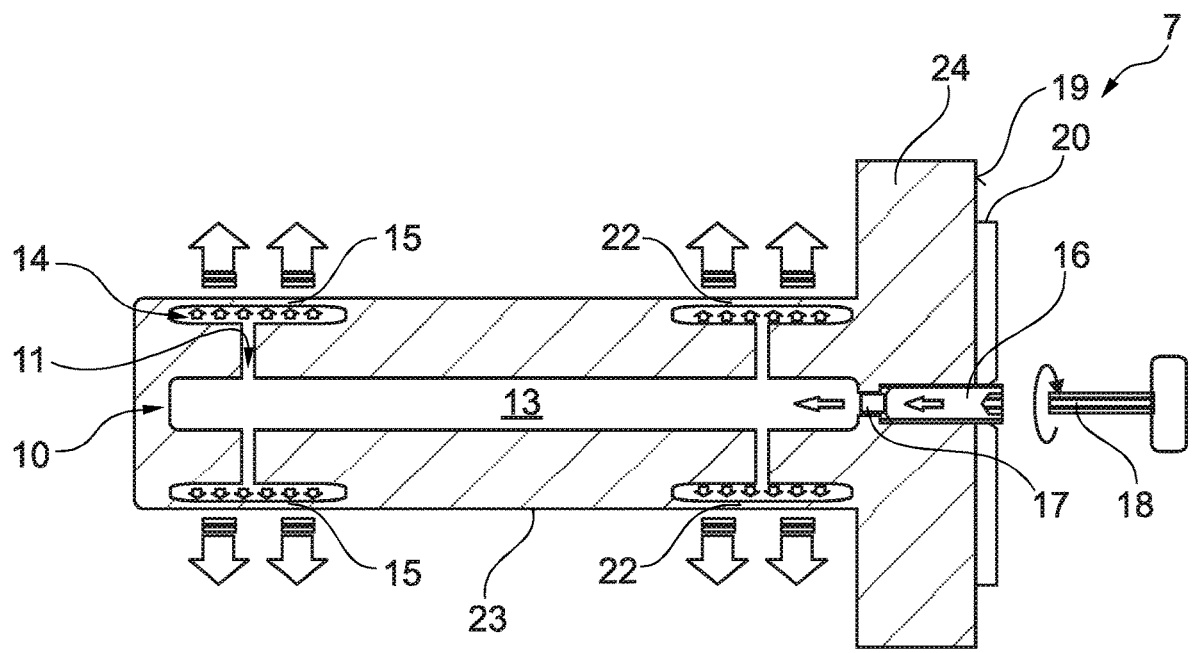
FIG. 2 shows a hydraulic rapid-mounting mandrel.

In the embodiment according to FIG. 2, the rapid-mounting device 10 is designed as a hydraulic mounting device of the rapid-mounting mandrel 7. In the longitudinal section according to FIG. 2, the rapid-mounting mandrel 7 describes a T-shape having a cylindrical section 23 and a flange 24 closing the same. On the end face of the flange 24, there is a cylindrical driver receptacle 20 and a driver stop surface 19 surrounding it in an annular manner.

Within the cylindrical section 23 of the rapid-mounting mandrel 7 according to FIG. 2, there is a central fluid chamber 13 which extends over the largest part of the length of the cylindrical section 23. A plurality of fluid channels 11 extend from the central fluid chamber 13 and end in outer fluid chambers 14. The outer fluid chambers 14 are immediately radially surrounded by expansion regions 15, 22, which are located near the end of the cylindrical section 23 to be inserted into the receiving region 5 or near the flange 24.

The pressure within the central fluid chamber 13 and the outer fluid chambers 14 connected thereto can be adjusted using an adjusting screw 16 which acts on a piston 17. In addition, an actuating tool 18 for actuating the adjusting screw 16 is indicated in FIG. 2. The actuating tool 18 can be attached to the end face of the flange 24 through an opening in the workpiece driver 6, not shown in FIG. 2.

Figure 1:
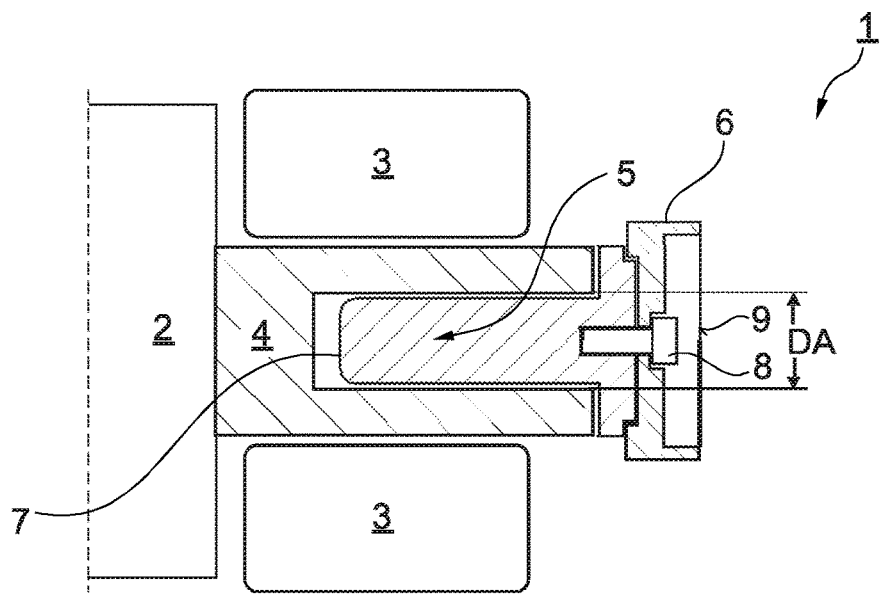
FIG. 1 shows a roughly schematic representation of a mounting system.
Figure 3:
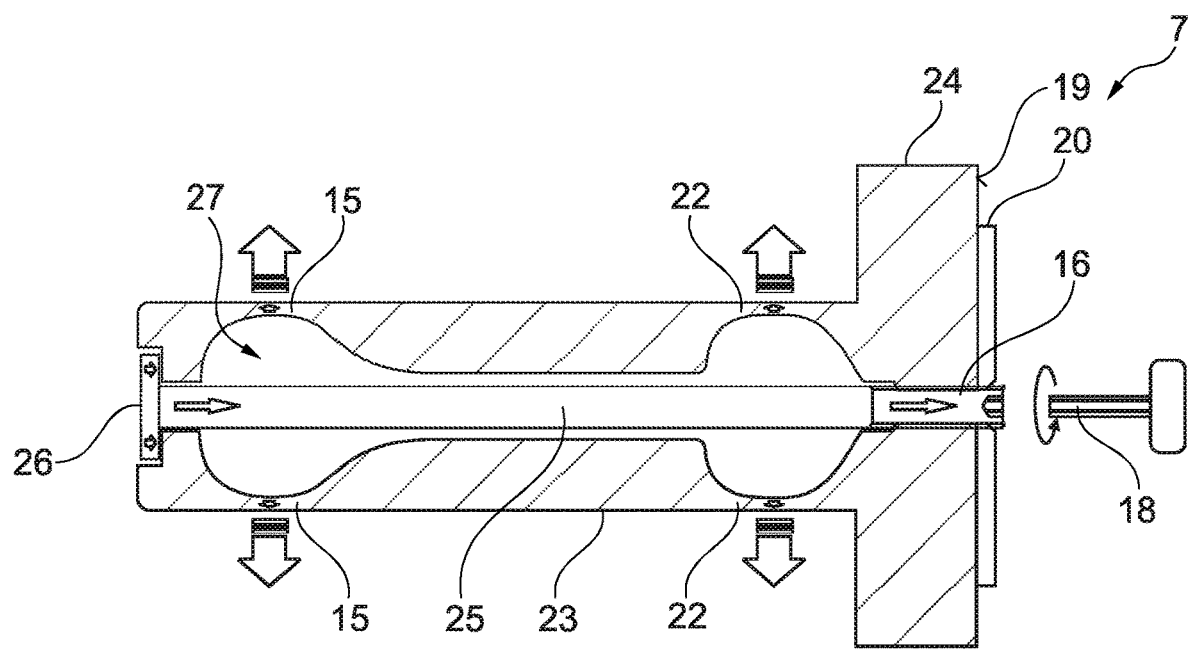
FIG. 3 shows a mechanical rapid-mounting mandrel.

The rapid-mounting mandrel 7 according to FIG. 3, like the rapid-mounting mandrel 7 according to FIG. 2, can be used in the mounting system 1 according to FIG. 1. The rapid-mounting mandrel 7 according to FIG. 3 differs from the design according to FIG. 2 in that it is designed as a mechanical mounting element. In this case, the adjusting screw 16 engages a tension rod 25 which extends through almost the entire cylindrical section 23 and is anchored at the end thereof by means of a plate 26. The position of the expansion regions 15, 22 corresponds to the exemplary embodiment according to FIG. 2. In the design according to FIG. 3, the wall thickness of the cylindrical section 23 is drastically reduced at the expansion regions 15, 22, so that the corresponding regions 15, 22 are elastically deformable by tensile forces that are introduced into the tension rod 25 and by compressive forces within the expansion regions 15, 22.

The mounting system 1 according to FIG. 4 differs from the embodiments according to FIGS. 2 and 3 in that the rapid-mounting device 10 is not integrated in the rapid-mounting mandrel 7, but in the magnet core 4. Accordingly, in this case, fluid channels 11 are located inside the magnet core 4. Via the fluid channels 11, pressure elements 12, which contact the rapid-mounting mandrel 7 at corresponding expansion regions 15, 22 at two axially spaced apart points, can be subjected to pressure. The axial distance between the pressure elements 12, which are arranged in an annular manner around the rapid-mounting mandrel 7, is denoted by LS. In an analogous manner, with the rapid-mounting mandrels 7 according to FIG. 2 and FIG. 3, LS is to be understood as the axial distance between the center of the expansion region 15 and the center of the expansion region 22. There is no possibility of pressure adjustment on the rapid-mounting mandrel 7 in the embodiment according to FIG. 4. The workpiece driver 6 is fastened to the rapid-mounting mandrel 7 by a single, central fixing screw 8 which is inserted through an opening 21 in the workpiece driver 6.

Figure 6:
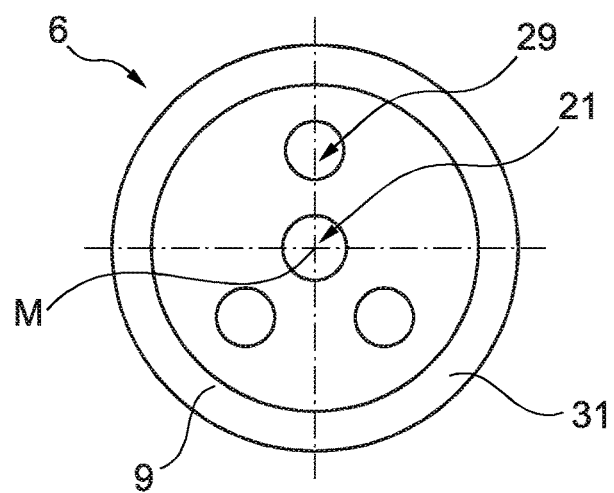
FIG. 6 shows the workpiece driver of the arrangement according to FIG. 5.

Further geometric features of a rapid-mounting mandrel 7, a workpiece driver 6 and a magnet core 4 are illustrated in FIGS. 5 and 6. Forces acting in the expansion regions 15, 22 are denoted by F. The mounting mechanism, not shown in FIG. 5, can work either hydraulically according to FIG. 2 or mechanically according to FIG. 3. In the latter case, as can be seen in FIG. 3, the cylindrical section 23 has a cavity 27.

In the embodiment according to FIG. 5, the magnet core 4 is fastened to the grinding spindle 2 with a central screw 28. The diameter of the receiving region 5 is somewhat reduced in the two annular sections of the receiving region 5, against which the expanding regions 15, 22 are pressed. This ensures that there is contact between the rapid-mounting mandrel 7 and the wall of the receiving region 5 only in two defined regions, the distance between which is LS. The minimum inside diameter of the receiving region 5 is denoted by DA (FIG. 1). The diameter DA is smaller than the length LS, i.e. the distance between the two expansion regions 15, 22.

In the embodiment according to FIG. 5, the receiving region 5 is sealed off from the outside by a seal 30 which is inserted between a groove on the end face of the magnet core 4 and a groove on the flange 24 of the rapid-mounting mandrel 7. The connection between the rapid-mounting mandrel 7 and the workpiece driver 6 is established according to FIG. 5 by a plurality of fixing screws 8 which are arranged in an annular region outside the central axis M. The fixing screws 8 are therefore located radially inside an annular edge region 31, which provides the workpiece stop surface 9. The adjusting screw 16, not shown in FIG. 5, can be actuated through the central opening 21 of the workpiece driver 6. In this way, the rapid-mounting mandrel 7 inserted into the magnet core can be practically mounted in a geometrically precisely defined position with a single motion. Then—without reworking the workpiece stop surface 9—the workpiece to be ground, for example a roller bearing ring, can immediately be placed on the workpiece stop surface 9 and mounted magnetically there.

REFERENCE NUMERALS

1 Mounting system
2 Workpiece spindle
3 Magnet coil
4 Magnet core
5 Receiving region
6 Workpiece driver
7 rapid-mounting mandrel
8 Fixing screw
9 Workpiece stop surface
10 Rapid-mounting device
11 Fluid channel
12 Pressure element
13 Central fluid chamber
14 Outer fluid chamber
Expansion region
16 Adjusting screw
17 Piston
18 Operating tool
19 Driver stop surface
Driver receptacle
21 Opening
22 Expansion region
23 Cylindrical section
24 Flange
Tension rod
26 Plate
27 Cavity
28 Screw
29 Bore
Seal
31 Annular edge region
DA Diameter of the receiving region
F Force
LS Length of the expansion system
M Central axis

The invention claimed is:

1. A workpiece mounting system for a grinding machine, the workpiece mounting system comprising:
    a magnet core mounted on a spindle, the magnet core comprising a cylindrical, elongate receiving region having a central axis;
    a magnet coil, the magnet core positioned inside the magnet coil;
    a rapid-mounting mandrel arranged for insertion into the cylindrical, elongate receiving region of the magnet core; and
    a discoid workpiece driver, detachably fastened to the rapid-mounting mandrel and extending normal to the central axis, wherein:
        the magnet core comprises a rapid-mounting device for mounting the rapid-mounting mandrel in the magnet core;
        the rapid-mounting device is integrated into the cylindrical, elongate receiving region of the magnet core; and
        the rapid-mounting device is formed as a hydraulic mounting device, the hydraulic mounting device comprising pressure elements configured to apply pressure and contact the rapid-mounting mandrel in order to mount the rapid-mounting mandrel.

2. A workpiece mounting system for a grinding machine, the mounting system comprising:
    a magnet core mounted on a spindle, the magnet core comprising a cylindrical, elongate receiving region having a central axis;
    a magnet coil, the magnet core positioned inside the magnet coil;
    a rapid-mounting mandrel arranged for insertion into the cylindrical, elongate receiving region of the magnet core; and
    a discoid workpiece driver, detachably fastened to the rapid-mounting mandrel and extending normal to the central axis, wherein:
        the rapid-mounting mandrel comprises a rapid-mounting device for mounting the rapid-mounting mandrel in the magnet core;
        the rapid-mounting device is integrated in the rapid-mounting mandrel; and
        wherein the rapid-mounting device is formed as a hydraulic mounting device, the hydraulic mounting device configured to expand the rapid-mounting mandrel in order to mount the rapid-mounting mandrel in the cylindrical, elongate receiving region.

3. The workpiece mounting system of claim 2, further comprising an adjusting screw for actuating the rapid-mounting device, wherein:
    the discoid workpiece driver comprises an opening; and
    the adjusting screw can be actuated through the opening.

4. The workpiece mounting system of claim 2, wherein the rapid-mounting device has a first expansion region and a second expansion region, the second expansion region spaced apart from the first expansion region in an axial direction of the rapid-mounting mandrel.

5. The workpiece mounting system of claim 4, wherein an axial distance between a first center of the first expansion region and a second center of the second expansion region is greater than a diameter of the cylindrical, elongate receiving region.

6. A workpiece mounting system for a grinding machine, the mounting system comprising:
- a magnet core mounted on a spindle, the magnet core comprising a cylindrical, elongate receiving region having a central axis;
- a magnet coil, the magnet core arranged inside the magnet coil;
- a rapid-mounting mandrel arranged for insertion into the cylindrical, elongate receiving region of the magnet core, and
- a discoid workpiece driver, detachably fastened to the rapid-mounting mandrel and extending normal to the central axis, wherein:
    - the rapid-mounting mandrel comprises a rapid-mounting device for mounting the rapid-mounting mandrel in the magnet core;
    - the rapid-mounting device is integrated in the rapid-mounting mandrel;
    - the rapid mounting device is formed as a mechanical mounting device having a tension rod; and
    - the rapid-mounting device also has a first elastically deformable expansion region and a second elastically deformable expansion region, the second elastically deformable expansion region spaced apart from the first elastically deformable expansion region in an axial direction of the rapid-mounting mandrel, the first and second elastically deformable expansion regions configured to mount the rapid-mounting mandrel in the cylindrical, elongate receiving region.

7. The workpiece mounting system of claim 6, wherein an axial distance between a first center of the first elastically deformable expansion region and a second center of the second elastically deformable expansion region is greater than a diameter of the cylindrical, elongate receiving region.

8. The workpiece mounting system of claim 6, further comprising an adjusting screw for actuating the rapid-mounting device, wherein:
- the discoid workpiece driver comprises an opening; and
- the adjusting screw can be actuated through the opening.

* * * * *